Nov. 10, 1925.
N. J. JONES, JR
1,561,434
TRAIN CONTROL SYSTEM
Filed Oct. 5, 1923
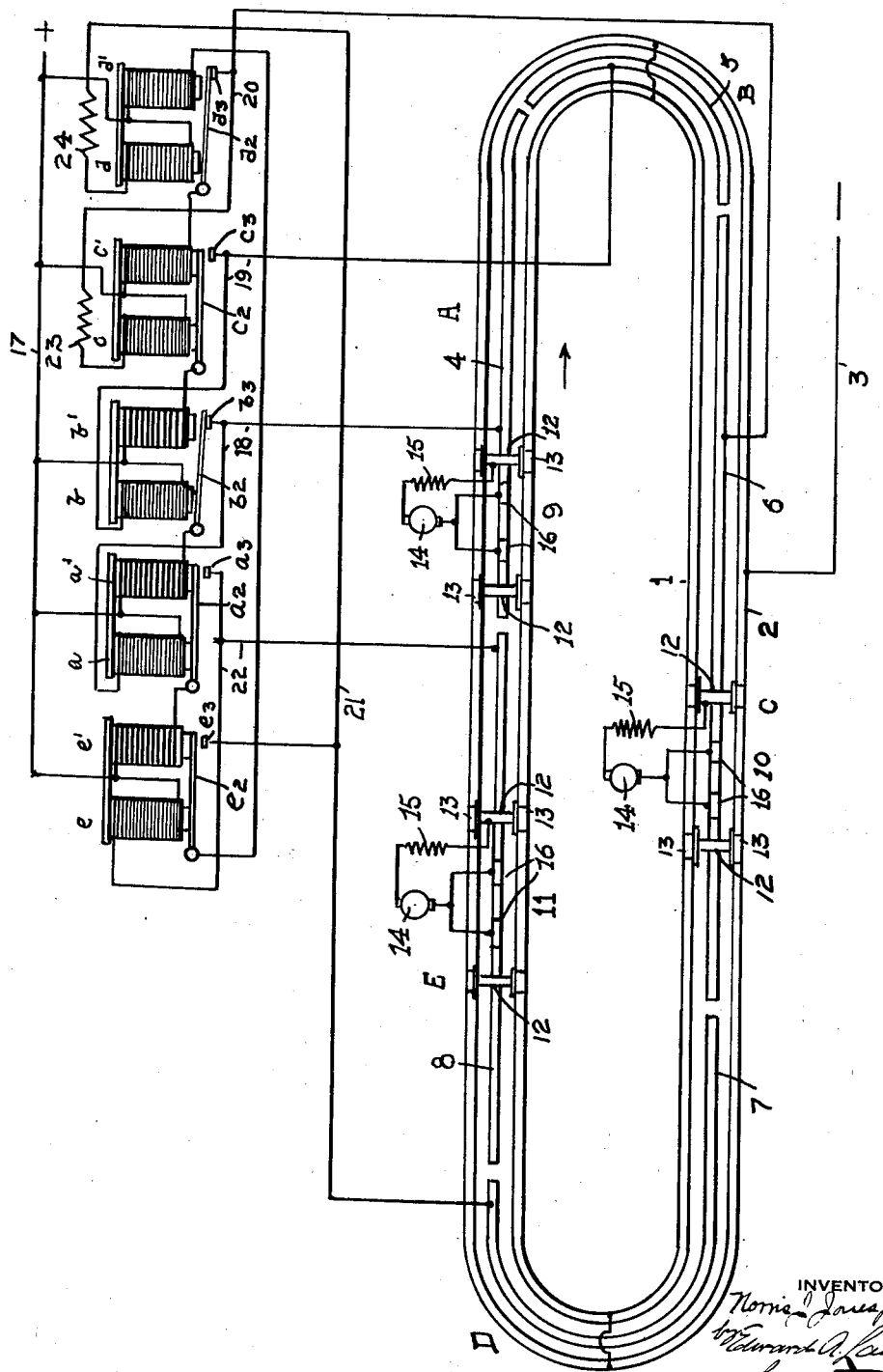
INVENTOR Patented Nov. 10, 1925.

1,561,434

UNITED STATES PATENT OFFICE.

NORRIS J. JONES, JR., OF PITTSBURGH, PENNSYLVANIA; LOTTIE JONES, EXECUTRIX OF SAID NORRIS J. JONES, JR., DECEASED.

TRAIN-CONTROL SYSTEM.

Application filed October 5, 1923. Serial No. 666,695.

*To all whom it may concern:*

Be it known that I, NORRIS J. JONES, Jr., a citizen of the United States, residing at Pittsburgh, in the county of Allegheny, and State of Pennsylvania, have invented new and useful Improvements in Train-Control Systems, of which the following is a specification.

My invention relates to train-control systems. Although it is intended primarily for toy systems, it is adapted for use with standard railway equipments.

It is the principal object of this invention to prevent the travel of a car on a block at the rear of a block occupied by another train. In case a train is on a block it prevents a train from running on the next block to the rear.

Referring to the accompanying drawing, the figure is a diagrammatic view of a toy system involving the principles of my invention.

1 and 2 are a pair of endless traction rails electrically connected together and constituting the common electric current return for all the cars thereon, the rails being connected to the current supply line 3. I provide a third rail divided in the present instance into five sections 4, 5, 6, 7, and 8, insulated from one another and from the rails 1 and 2. These sections divide the railroad into five blocks A, B, C, D, and E, respectively.

I show three motor cars 9, 10, and 11 on blocks A, C, and E, respectively, the cars being represented in each instance by two pairs of axles 12, provided with wheels 13 on the rails 1 and 2. Each car has a motor armature 14 and a field winding 15 connected in series and to an axle 12 and the shoes 16 which slide on the third rail.

I provide a pair of electromagnets for each block, the members of the pair connected to the block A being marked $a$ and $a'$, the members of the pair connected to the block B being marked $b$ and $b'$, and so on for the remaining blocks and pairs of electromagnets. One terminal of each of the windings of the electromagnets is connected to the current-supply wire 17. The remaining terminals of the windings of the electromagnets $a$, $b$, $c$, $d$, and $e$ are connected by the respective wires 18, 19, 20, 21, and 22 to the respective rail sections 4, 5, 6, 7, and 8. The remaining terminals of the windings of the electromagnets $a'$, $b'$, $c'$, $d'$, and $e'$ are connected respectively to the armatures $b^2$, $c^2$, $d^2$, $e^2$, and $a^2$, which engage their respective contacts $b^3$, $c^3$, $d^3$, $e^3$ and $a^3$, when the electromagnets, $b'$, $c'$, $d'$, $e'$, and $a'$, respectively are deenergized.

It is desirable that the current passing through the windings of the electromagnets $a$, $b$, $c$, $d$ and $e$, be sufficient to lift the armatures, but not sufficient to operate motor cars on the blocks to which they are connected. To accomplish this, I may select wire for the said windings of such gage as to reduce the current to the proper value, as shown in the electromagnets $a$, $b$, and $e$, while the windings of the electromagnets $a'$, $b'$, $c'$, $d'$, and $e'$ are of such gage as to permit current enough to pass to operate such motor cars as may be electrically connected thereto. Instead of making the windings of the magnets $a$, $b$, and $c$ contain the required resistance to prevent the operation of the motor cars, I may place separate resistance in series with the windings. I have shown the windings of the electromagnets $c$ and $d$ in series with such resistances 23 and 24 respectively. Instead of employing two electromagnets for each block I may use only one electromagnet with both windings wound one upon the other.

The drawing shows the positions of the several parts of my system when cars are on the blocks A, C, and E. The car 9 is free to run, since current may flow through its motor by the circuit following: From the supply line 17 through the winding $a'$, the armature $b^2$, the contact $b^3$, the wire 18, the rail section 4, the shoes 16, the armature 14, the field 15, the rails 1 and 2 to the other supply line 3. Current flows also from the line 17 through the winding $a$ to the wire 18. The current through the magnets $a$ and $a'$ causes the armature $a^2$ to be lifted from its contact $a^3$. This armature when lifted prevents motor-operating current reaching the rail-section 8 in block E. Therefore the car 11 was stopped on the block E as soon as it entered the same, but the car 11 completes a circuit from the line 17 through the magnet $e$, which caused the armature $e^2$ to be lifted, thereby opening at the contact $e^3$ the motor-operating circuit through the wire 21 and the rail-section 7, so that, if the car 10 should enter section D, it would receive no motor-operating current in that block. The motor on block E receives some current through the magnet $e$, but not enough to operate it. The car 10 is free to run in the block C, as its motor circuit is completed through the armature $d^2$, but it will, as stated, be stopped upon entering block D, since the car 11 on the block E has completed the circuit through the winding $e$ whereby the armature $e^2$ is lifted and held lifted. The car 10 has made the block B dead since it has completed a circuit through the magnet $c$ which has lifted the armature $c^2$, thereby opening the motor-operating circuit to the rail section 5. As soon as the car C enters the section D, cars 9 and 11 still being as shown, it will close a circuit through the magnet $d$ and cause the armature $d^2$ to be lifted, thereby cutting off current supply to the rail section 6. Current then flowing through the winding $d$ will owing to the resistance 24 be insufficient to drive the motor of car 10.

A car is free to run on a section if the section ahead is not occupied, but the car causes the armature controlling the next block behind to be lifted, thereby making the latter block dead. When a car enters a dead block it causes the armature controlling the block behind to be lifted by the action of the high resistance magnet or the external resistance, as 23 or 24. A train running on a block opens a circuit through the winding of the right hand magnet of the next block in the rear, and this magnet lifts the armature for the later block and prevents it from receiving enough current to operate the motor of a car entering that block. When a car enters a block just back of an occupied block it completes through the left hand magnet for the first named block a circuit, thereby causing the armature for that magnet to be lifted, whereby the block at the rear of the first block receives current only through its left hand magnet, and a car entering the third named block will not receive motor-operating current, but only current sufficient to make the block in the rear dead.

I claim—

1. In a safety electric railway system, a sectional conductor dividing the railway system into blocks, each section of the conductor being electrically continuous, means including for each block only one switch having only one pair of contacts, whereby a car on any block prevents a car on the next block in the rear thereof from receiving motor-operating current, and whereby the said second car prevents a car in the next block in the rear thereof from receiving motor-operating current.

2. In a safety electric railway system, a current-feeder circuit, a sectional conductor dividing the railway system into blocks, only one switch for each block, each switch having only one pair of contacts, and each switch biased to closed position in which it connects the current-feeder circuit to one conductor-section, and means whereby a car on one block causes the switch for the next block in the rear to be opened.

3. In a safety electric railway system, a current-feeder circuit, a sectional conductor dividing the railway system into blocks, only one switch for each block, each switch having only one pair of contacts, and each switch biased to closed position in which it connects the current-feeder circuit to one conductor-section, means whereby a car on one block causes the switch for the next block in the rear to be opened, and means whereby the second car on the next block in the rear causes the opening of the switch in the next block in the rear thereof.

4. In a safety electric railway system, a current-feeder circuit, a sectional conductor dividing the railway system into blocks, only one switch for each block, each switch having only one pair of contacts, and each switch biased to closed position, and an electromagnet in series with each switch and the feeder-circuit and operating, when a switch is closed, to open the next switch in the rear and means for automatically opening the switch in the next block in the rear of two consecutive blocks occupied by cars.

5. In a safety electric railway system, a current-feeder circuit, a sectional conductor dividing the railway system into blocks, a single movable switch member for each block, each switch biased to closed position, an electromagnet in series with each switch and the feeder-circuit and operating, when the switch member is closed, to open the next switch in the rear, and a second electromagnet for each block in circuit with the feeder and a conductor-section operated by a car on a block whose switch is open, to open the switch of the next block in the rear.

6. In a safety electric railway system, a sectional conductor dividing the railway system into blocks, each section of the conductor being electrically continuous, each block having only one switch having only one pair of contacts for each section, and means whereby, when a car is one one block, current passing through the said contacts prevents a car in the next block in the rear from receiving motor-operating current, and also supplies motor-operating current to the first car, in case the next block in front of the first car is unoccupied by a car.

In testimony whereof I hereunto affix my signature this 18th day of September, 1923.

NORRIS J. JONES, Jr.